United States Patent
Takeyama et al.

(10) Patent No.: US 12,031,082 B2
(45) Date of Patent: Jul. 9, 2024

(54) SEAL MATERIAL

(71) Applicants: ZEON CORPORATION, Tokyo (JP); AIR WATER MACH INC., Matsumoto (JP)

(72) Inventors: Yoshihisa Takeyama, Tokyo (JP); Masahiro Ueno, Tokyo (JP); Yasuhiro Isoda, Matsumoto (JP); Takeshi Terashima, Azumino (JP)

(73) Assignees: ZEON CORPORATION, Tokyo (JP); AIR WATER MACH INC., Matsumoto (JP)

( * ) Notice: Subject to any disclaimer, the term of this patent is extended or adjusted under 35 U.S.C. 154(b) by 725 days.

(21) Appl. No.: 17/270,863

(22) PCT Filed: Aug. 21, 2019

(86) PCT No.: PCT/JP2019/032701
§ 371 (c)(1),
(2) Date: Feb. 24, 2021

(87) PCT Pub. No.: WO2020/040221
PCT Pub. Date: Feb. 27, 2020

(65) Prior Publication Data
US 2021/0395586 A1    Dec. 23, 2021

(30) Foreign Application Priority Data

Aug. 24, 2018  (JP) .................................. 2018-157715
Aug. 24, 2018  (JP) .................................. 2018-157737

(51) Int. Cl.
| | | |
|---|---|---|
| C09K 3/10 | (2006.01) | |
| C08K 3/04 | (2006.01) | |
| C08K 3/22 | (2006.01) | |
| F16J 15/10 | (2006.01) | |

(52) U.S. Cl.
CPC .............. *C09K 3/1009* (2013.01); *C08K 3/04* (2013.01); *C08K 3/041* (2017.05); *C08K 3/22* (2013.01); *F16J 15/102* (2013.01); *C08K 2003/2206* (2013.01); *C08K 2003/222* (2013.01); *C08K 2201/003* (2013.01); *C08K 2201/004* (2013.01); *C08K 2201/006* (2013.01); *C09K 2003/1068* (2013.01)

(58) Field of Classification Search
CPC ........ C09K 3/1009; C08K 3/041; C08K 3/04; C08K 3/22; C08K 2003/2206; F16J 15/102
See application file for complete search history.

(56) References Cited

U.S. PATENT DOCUMENTS

| | | | |
|---|---|---|---|
| 2008/0131644 A1 | 6/2008 | Kuboyama et al. | |
| 2008/0318049 A1 | 12/2008 | Hata et al. | |
| 2019/0112465 A1 | 4/2019 | Takeyama | |

FOREIGN PATENT DOCUMENTS

| | | |
|---|---|---|
| CN | 106633544 A | 5/2017 |
| EP | 3650497 A1 | 5/2020 |
| JP | 2008138107 A | 6/2008 |
| JP | 2016044732 A | 4/2016 |
| WO | 2006011655 A1 | 2/2006 |
| WO | 2017175807 A1 | 10/2017 |

OTHER PUBLICATIONS

English machine translation of CN 106633544A. (Year: 2017).*
Chemours. Viton A-HV Fluoroelastomers Technical Information. (Year: 2020).*
Birch et al. Properties that Influence the Specific Surface Areas of Carbon Nanotubes and Nanofibers. Ann Occup Hyg. Nov. 2013; 57(9): 1148-1166. (Year: 2015).*
Nov. 12, 2019, International Search Report issued in the International Patent Application No. PCT/JP2019/032701.
Mar. 18, 2022, the Extended European Search Report issued by the European Patent Office in the corresponding European Patent Application No. 19851223.8.
Mar. 2, 2021, International Preliminary Report on Patentability issued in the International Patent Application No. PCT/JP2019/032701.

* cited by examiner

*Primary Examiner* — John E Uselding
(74) *Attorney, Agent, or Firm* — KENJA IP LAW PC

(57) ABSTRACT

Provided is a seal material having excellent non-adherence to metal surfaces. The seal material is formed of a cross-linked rubber that is obtained through cross-linking of a cross-linkable rubber composition containing a binary fluororubber, a carbon material, and a polyol cross-linker. The carbon material includes one or more carbon nanotubes. The cross-linked rubber has an adhesion strength of 2 N or less to a metal surface after being heated at 250° C. for 70 hours while in contact with the metal surface.

14 Claims, No Drawings

SEAL MATERIAL

TECHNICAL FIELD

The present disclosure relates to a seal material.

BACKGROUND

There is currently demand for seal materials such as O-rings that are used in semiconductor production devices, semiconductor transportation devices, liquid-crystal production devices, vacuum instruments, and the like to display plasma resistance, heat resistance, cleanliness, chemical resistance, and so forth. Fluororubbers are typically used as such seal materials.

In general, rubber materials readily adhere to metal surfaces that they are intended to seal, which tends to lead to problems such as impairment of normal operation of devices in which opening and closing frequently occur. Moreover, in a situation in which a seal material adheres so strongly to a metal surface that it cannot be peeled off, forcefully attempting to peel off the seal material during maintenance may lead to problems such as rubber powder being rubbed off and causing malfunction of a device. The problem of adhesion to metal surfaces described above also arises for seal materials formed of fluororubbers having low surface energy and is particularly evident in devices such as those listed above due to exposure to a high degree of vacuum and high temperature.

Therefore, in recent years, much effort has been focused on the development of seal materials that have a low tendency to adhere to metal surfaces, and thus can be said to have excellent non-adherence to metal surfaces. As one example, Patent Literature (PTL) 1 discloses that a fluororubber shaped product that has undergone surface fluorination treatment, in which the atom number ratio of oxygen atoms/fluorine atoms and the bond number ratio of C—H bonds/C—$F_2$ bonds at the surface are not more than specific values, and for which the leaked amount 3 minutes after the start of a helium leak test is not more than a specific value has excellent non-adherence to metal surfaces, is provided with a suitable level of flexibility, and can display excellent sealing performance.

CITATION LIST

Patent Literature

PTL 1: JP2008-138107A

SUMMARY

Technical Problem

However, there is still room for improvement of non-adherence to metal surfaces of a seal material formed of the fluororubber shaped product according to the conventional technique described above.

Accordingly, an object of the present disclosure is to provide a seal material having excellent non-adherence to metal surfaces.

Solution to Problem

The inventors conducted diligent investigation to achieve the object set forth above. The inventors discovered that a seal material formed of a cross-linked rubber that is obtained through cross-linking of a cross-linkable rubber composition containing a binary fluororubber, a carbon material including one or more carbon nanotubes, and a polyol cross-linker and that has an adhesion strength to a metal surface of not more than a specific value after being heated under specific conditions while in contact with the metal surface has excellent non-adherence to metal surfaces, and, in this manner, completed the present disclosure.

Specifically, the present disclosure aims to advantageously solve the problem set forth above, and a presently disclosed seal material comprises a cross-linked rubber, wherein the cross-linked rubber is obtained through cross-linking of a cross-linkable rubber composition containing a binary fluororubber, a carbon material, and a polyol cross-linker, the carbon material includes one or more carbon nanotubes, and the cross-linked rubber has an adhesion strength of 2 N or less to a metal surface after being heated at 250° C. for 70 hours while in contact with the metal surface. When a seal material is formed of a cross-linked rubber that is obtained through cross-linking of a cross-linkable rubber composition containing a binary fluororubber, a carbon material including one or more carbon nanotubes, and a polyol cross-linker and that has an adhesion strength to a metal surface of not more than the specific value set forth above after being heated under specific conditions while in contact with the metal surface, the seal material can display excellent non-adherence to metal surfaces.

Note that the "adhesion strength of the cross-linked rubber to a metal surface after being heated at 250° C. for 70 hours while in contact with the metal surface" referred to in the present disclosure can be determined by a method described in the EXAMPLES section of the present specification.

A ratio $Cs/Ca$ of concentration $Cs$ of the carbon material at a surface of the cross-linked rubber and average concentration $Ca$ of the carbon material in the cross-linked rubber is preferably 0.5 or more. When the ratio $Cs/Ca$ of the concentration $Cs$ of the carbon material at the surface of the cross-linked rubber and the average concentration $Ca$ of the carbon material in the cross-linked rubber is not less than the specific value set forth above, non-adherence to metal surfaces of the seal material can be further increased.

Note that the "ratio $Cs/Ca$ of concentration $Cs$ of the carbon material at a surface of the cross-linked rubber and average concentration $Ca$ of the carbon material in the cross-linked rubber" referred to in the present disclosure can be determined by a method described in the EXAMPLES section of the present specification.

Moreover, the ratio $Cs/Ca$ of the concentration $Cs$ of the carbon material at the surface of the cross-linked rubber and the average concentration $Ca$ of the carbon material in the cross-linked rubber is preferably more than 1 and not more than 8. When the ratio $Cs/Ca$ of the concentration $Cs$ of the carbon material at the surface of the cross-linked rubber and the average concentration $Ca$ of the carbon material in the cross-linked rubber is within the specific range set forth above, sufficiently high strength of the seal material can be ensured while also even further increasing non-adherence to metal surfaces of the seal material.

The presently disclosed seal material is typically used in an environment in which the seal material is in tight contact with a metal surface.

In the presently disclosed seal material, it is preferable that the binary fluororubber is a vinylidene fluoride-hexafluoropropylene copolymer, and the vinylidene fluoride-hexafluoropropylene copolymer has a fluorine content of not less than 65 mass % and not more than 70 mass %. When the binary fluororubber is a vinylidene fluoride-hexafluoropropylene copolymer and when the vinylidene fluoride-hexafluoropropylene copolymer has a fluorine content that is within the specific range set forth above, non-adherence to metal surfaces of the seal material can be further increased.

In the presently disclosed seal material, it is preferable that the carbon material includes carbon black, and content of the carbon black in the cross-linkable rubber composition is not less than 5 parts by mass and not more than 40 parts by mass per 100 parts by mass of the binary fluororubber. When the carbon material includes carbon black and when the content of the carbon black in the cross-linkable rubber composition is within the specific range set forth above, sufficiently high sealing performance of the obtained seal material can be ensured while also increasing compression set resistance of the seal material.

In the presently disclosed seal material, the carbon material contained in the cross-linked rubber preferably has a surface area S of 5 m$^2$/g or more. When the surface area S is within the range set forth above, non-adherence to metal surfaces of the seal material can be further increased.

The "surface area S of the carbon material contained in the cross-linked rubber" referred to in the present disclosure can be determined by the following calculation method. In a case in which the cross-linked rubber contains carbon materials $C_1$ to $C_n$ ($C_1$ to $C_n$ are different carbon materials and n is an integer of 1 or more), the "surface area S of the carbon material contained in the cross-linked rubber" can be calculated by the following formula (1) when the BET specific surface areas of the carbon materials $C_1$ to $C_n$ are taken to be $S_1$ to $S_n$ (m$^2$/g), respectively, and when the contents of the carbon materials $C_1$ to $C_n$ in the total amount A (g) of the cross-linked rubber are taken to be $R_1$ to $R_n$ (g), respectively. The term "BET specific surface area" as used in the present disclosure refers to nitrogen adsorption specific surface area measured by the BET method.

$$S=\Sigma[S_i \times (R_i/A)](m^2/g) \quad (1)$$

[i is an integer of not less than 1 and not more than n]

However, when the BET specific surface area $S_i$ (m$^2$/g) and/or the content $R_i$ (g) in the cross-linked rubber of each carbon material $C_i$ is unknown, for example, S can be calculated by considering the carbon material contained in the cross-linked rubber to be just one type of carbon material ($C_1$) and using $S_1$ (m$^2$/g) and $R_1$ (g) determined by the following methods in formula (1). Specifically, the cross-linked rubber is heated to 600° C. under a nitrogen atmosphere in a heating furnace, the heating furnace is cooled to 400° C., the atmosphere is subsequently converted to an air or oxygen atmosphere, heating is performed to an arbitrarily selected temperature, and carbonaceous residue produced through thermal decomposition is removed to obtain a sample of the carbon material $C_1$ that can then be used to measure the BET specific surface area $S_1$ (m$^2$/g). Moreover, the content $R_1$ (g) of the carbon material $C_1$ in the cross-linked rubber can be measured in accordance with JIS K6226-2:2003.

In the presently disclosed seal material, the carbon nanotubes preferably include one or more single-walled carbon nanotubes. When the carbon nanotubes include single-walled carbon nanotubes, non-adherence to metal surfaces of the seal material can be even further increased.

In the presently disclosed seal material, content of the carbon nanotubes in the cross-linkable rubber composition is preferably not less than 0.1 parts by mass and not more than 4 parts by mass per 100 parts by mass of the binary fluororubber. When the content of the carbon nanotubes in the cross-linkable rubber composition is within the specific range set forth above, sufficiently high compression set resistance of the seal material can be ensured while also further increasing non-adherence to metal surfaces of the seal material.

In the presently disclosed seal material, the polyol cross-linker is preferably a polyhydroxy aromatic compound. When the polyol cross-linker is a polyhydroxy aromatic compound, compression set resistance of the seal material can be increased.

Moreover, in the presently disclosed seal material, content of the polyhydroxy aromatic compound in the cross-linkable rubber composition is preferably 10 parts by mass or less per 100 parts by mass of the binary fluororubber. When the content of the polyhydroxy aromatic compound in the cross-linkable rubber composition is not more than the specific value set forth above, compression set resistance of the seal material can be further increased.

In the presently disclosed seal material, the cross-linkable rubber composition preferably further contains a cross-linking promoter. When the cross-linkable rubber composition further contains a cross-linking promoter, compression set resistance of the seal material can be increased.

Moreover, in the presently disclosed seal material, it is preferable that the cross-linking promoter includes at least one selected from the group consisting of an ammonium salt, a phosphonium salt, and an amine compound, and content of the cross-linking promoter in the cross-linkable rubber composition is not less than 0.1 parts by mass and not more than 5 parts by mass per 100 parts by mass of the binary fluororubber. When the cross-linking promoter includes at least one selected from the group consisting of an ammonium salt, a phosphonium salt, and an amine compound and when the content of the cross-linking promoter in the cross-linkable rubber composition is within the specific range set forth above, compression set resistance of the seal material can be further increased.

In the presently disclosed seal material, the cross-linkable rubber composition preferably further contains an acid acceptor. When the cross-linkable rubber composition further contains an acid acceptor, non-adherence to metal surfaces and compression set resistance of the seal material can be increased.

Moreover, in the presently disclosed seal material, the acid acceptor preferably includes magnesium oxide and calcium hydroxide. When the acid acceptor includes magnesium oxide and calcium hydroxide, compression set resistance of the seal material can be further increased.

In the presently disclosed seal material, the cross-linked rubber preferably has a surface resistivity of $1 \times 10^8$ Ω/sq. or less. When the surface resistivity of the cross-linked rubber is not more than the specific value set forth above, the seal material has excellent electrical conductivity and can well prevent interference caused by static electricity, such as attachment contaminants.

Note that the "surface resistivity of the cross-linked rubber" referred to in the present disclosure can be measured by a method described in the EXAMPLES section of the present specification.

In the presently disclosed seal material, the cross-linked rubber preferably has a compression set of 80% or less after being heated at 250° C. for 70 hours. When the compression set of the cross-linked rubber after being heated at 250° C. for 70 hours is not more than the specific value set forth above, the seal material has excellent compression set resistance and thus can maintain good sealing performance over a long period.

Note that the "compression set of the cross-linked rubber after being heated at 250° C. for 70 hours" referred to in the present disclosure can be measured by a method described in the EXAMPLES section of the present specification.

Advantageous Effect

According to the present disclosure, it is possible to provide a seal material having excellent non-adherence to metal surfaces.

DETAILED DESCRIPTION

The following provides a detailed description of embodiments of the present disclosure.
(Seal material)
The presently disclosed seal material is formed of a cross-linked rubber that is obtained through cross-linking of a cross-linkable rubber composition containing a binary fluororubber, a carbon material including one or more carbon nanotubes, and a polyol cross-linker and that has an adhesion strength to a metal surface of not more than a specific value after being heated under specific conditions while in contact with the metal surface. Such a seal material can display excellent non-adherence to metal surfaces.

Although it is not clear why the presently disclosed seal material can display excellent non-adherence to metal surfaces, it is presumed that a radical trapping effect of the carbon material including the carbon nanotubes inhibits thermal degradation of the binary fluororubber, and thereby inhibits chemical bond formation between a metal surface and degraded binary fluororubber.

The presently disclosed seal material can be used in any application without any specific limitations but is typically used in an environment in which the seal material is in tight contact with a metal surface. Specifically, the presently disclosed seal material can be well used as a seal material used in a semiconductor production device, a semiconductor transportation device, a liquid-crystal production device, a vacuum instrument, or the like. The presently disclosed seal material has a low tendency to adhere to a metal surface even when it is used in an environment in which the seal material is in tight contact with a metal surface, and thus has long service life and excellent reusability. Moreover, the presently disclosed seal material can shorten the work time required for replacement of a component, for example, as a result of having a low tendency to adhere to a metal surface and being easily peelable from a metal surface. Furthermore, as a result of the presently disclosed seal material having a low tendency to adhere to a metal surface and destruction of the base material thereof being unlikely to occur when the seal material is peeled from a metal surface, the presently disclosed seal material can well prevent staining of a metal surface caused by some of the cross-linked rubber originating from the seal material remaining on the metal surface. This facilitates maintenance of a device, instrument, or the like in which the presently disclosed seal material is installed.

Also, in a situation in which the presently disclosed seal material is used for a moveable part that performs rotational motion, reciprocating motion, repeated attachment and detachment, or the like in any of various devices or the like, operational problems caused by the seal material adhering to a metal surface of the moveable part are unlikely to occur.

Therefore, the aforementioned moveable part can be stably controlled when the presently disclosed seal material is used.

The presently disclosed seal material can have any shape that is in accordance with the application thereof. Specifically, the presently disclosed seal material may be an O-ring, packing, gasket, or other seal material.
<Cross-Linked Rubber>
The cross-linked rubber used in the presently disclosed seal material is obtained through cross-linking of a cross-linkable rubber composition containing a binary fluororubber, a carbon material including one or more carbon nanotubes, and a polyol cross-linker. Moreover, the adhesion strength of the cross-linked rubber to a metal surface after being heated under specific conditions while in contact with the metal surface is not more than a specific value.
<<Cross-Linkable Rubber Composition>>
The cross-linkable rubber composition is a rubber composition that can be cross-linked and is used to produce the cross-linked rubber set forth above. The cross-linkable rubber composition contains a binary fluororubber, a carbon material including one or more carbon nanotubes, and a polyol cross-linker. Note that besides the aforementioned components, the cross-linkable rubber composition may further contain compounding agents that are normally used in the field of rubber processing.
[Binary Fluororubber]
The binary fluororubber is a rubber that includes a structural unit derived from a fluorine-containing monomer and that is formed of a binary copolymer. The inclusion of a binary fluororubber in the cross-linkable composition makes it possible to obtain a cross-linked rubber and a seal material having good heat resistance and compression set resistance.

Specific examples of the binary fluororubber include a tetrafluoroethylene-perfluoroalkyl vinyl ether copolymer, a tetrafluoroethylene-hexafluoropropylene copolymer, a vinylidene fluoride-hexafluoropropylene copolymer, and a tetrafluoroethylene-propylene copolymer. Of these binary fluororubbers, a vinylidene fluoride-hexafluoropropylene copolymer is preferable from a viewpoint of increasing non-adherence to metal surfaces of the seal material.

In a case in which a vinylidene fluoride-hexafluoropropylene copolymer is used as the binary fluororubber, the fluorine content of the vinylidene fluoride-hexafluoropropylene copolymer is preferably not less than 65 mass % and not more than 70 mass %. When the fluorine content of the vinylidene fluoride-hexafluoropropylene copolymer is within the specific range set forth above, non-adherence to metal surfaces of the seal material can be further increased.

Examples of commercially available binary fluororubbers that can suitably be used include Viton A200, Viton A500, Viton A700, Viton AHV, Viton AL300, Viton AL600 (vinylidene fluoride-hexafluoropropylene copolymers), and the like produced by the Chemours Company, DAI-EL G-701, DAI-EL G-702, DAI-EL G-716, DAI-EL G-751, DAI-EL G-755, and the like produced by Daikin Industries, Ltd., Dyneon FC-2145, Dyneon FC-2230, FC-2178, and the like produced by Sumitomo 3M Limited, and Tecnoflon N215/U, Tecnoflon N535, Tecnoflon N935, Tecnoflon N60HS, Tecnoflon N90HS, and the like produced by Solvay.
[Carbon Material]
The carbon material used in the cross-linkable rubber composition includes one or more carbon nanotubes and optionally includes other carbon materials besides the carbon nanotubes.

—Carbon Nanotubes—

Although single-walled carbon nanotubes and/or multi-walled carbon nanotubes can be used as the carbon nanotubes (CNTs) without any specific limitations, carbon nanotubes having from 1 to 5 walls are preferable, and single-walled carbon nanotubes are more preferable. This is because characteristics of the cross-linked rubber and the seal material, such as non-adherence to metal surfaces, can be improved even using a small amount of the carbon nanotubes when the carbon nanotubes have fewer walls.

The average diameter of the carbon nanotubes is preferably 1 nm or more, and is preferably 60 nm or less, more preferably 30 nm or less, and even more preferably 10 nm or less. When the average diameter of the CNTs is 1 nm or more, dispersibility of the CNTs can be increased, and characteristics, such as non-adherence to metal surfaces, can stably be imparted to the cross-linked rubber and the seal material. Moreover, when the average diameter of the CNTs is 60 nm or less, characteristics, such as non-adherence to metal surfaces, can efficiently be imparted to the cross-linked rubber and the seal material even using a small amount of the CNTs.

Note that the "average diameter of the carbon nanotubes" referred to in the present disclosure can be determined by measuring the diameters (external diameters) of 100 CNTs, for example, in a transmission electron microscope (TEM) image, and then calculating a number-average value thereof.

The carbon nanotubes are preferably CNTs for which a ratio $3\sigma/Av$ of a value $3\sigma$, obtained by multiplying the diameter standard deviation ($\sigma$: sample standard deviation) by 3, relative to the average diameter (Av) is more than 0.20 and less than 0.60, more preferably CNTs for which $3\sigma/Av$ is more than 0.25, and even more preferably CNTs for which $3\sigma/Av$ is more than 0.40. By using CNTs for which $3\sigma/Av$ is more than 0.20 and less than 0.60, performance of the cross-linked rubber and the seal material can be further improved.

Note that the average diameter (Av) and the standard deviation (a) of the CNTs may be adjusted by altering the production method and the production conditions of the CNTs or may be adjusted by combining a plurality of types of CNTs obtained by different production methods.

The carbon nanotubes that are used typically take a normal distribution when a plot is made of diameter measured as described above on a horizontal axis and probability density thereof on a vertical axis, and a Gaussian approximation is made.

The average length of the carbon nanotubes is preferably 10 μm or more, more preferably 50 μm or more, and even more preferably 80 μm or more, and is preferably 800 μm or less, more preferably 700 μm or less, and even more preferably 600 μm or less. When the average length of the CNTs is 10 μm or more, conduction paths can be formed in the cross-linked rubber and the seal material using a small amount of the CNTs, and dispersibility of the CNTs can be improved. Moreover, when the average length of the CNTs is 800 μm or less, electrical conductivity of the cross-linked rubber and the seal material can be stabilized. Accordingly, surface resistivity of the cross-linked rubber and the seal material can be sufficiently reduced through the average length of the CNTs being within any of the ranges set forth above.

Note that the average length of the "carbon nanotubes" referred to in the present disclosure can be determined by measuring the lengths of 100 CNTs, for example, in a scanning electron microscope (SEM) image, and then calculating a number-average value thereof.

The BET specific surface area of the carbon nanotubes is preferably 200 $m^2/g$ or more, more preferably 400 $m^2/g$ or more, and even more preferably 600 $m^2/g$ or more, and is preferably 2,000 $m^2/g$ or less, more preferably 1,800 $m^2/g$ or less, and even more preferably 1,600 $m^2/g$ or less. When the BET specific surface area of the carbon nanotubes is 200 $m^2/g$ or more, dispersibility of the carbon nanotubes can be increased, and characteristics of the cross-linked rubber and the seal material, such as electrical conductivity, can be sufficiently enhanced using a small amount of the carbon nanotubes. Moreover, when the BET specific surface area of the carbon nanotubes is 2,000 $m^2/g$ or less, characteristics of the cross-linked rubber and the seal material, such as non-adherence to metal surfaces, can be stabilized.

The carbon nanotubes preferably exhibit a convex upward shape in a t-plot obtained from an adsorption isotherm. Note that a "t-plot" can be obtained by, in an adsorption isotherm of the carbon nanotubes measured by nitrogen gas adsorption, converting relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0, and the relative pressure is converted to the corresponding average adsorbed nitrogen gas layer thickness t to obtain a t-plot for the carbon nanotubes (t-plot method of de Boer et al.).

In a substance having pores at its surface, the growth of the adsorbed layer of nitrogen gas is categorized into the following processes (1) to (3). The gradient of the t-plot changes in accordance with processes (1) to (3).
(1) A process in which a single molecule adsorption layer of nitrogen molecules is formed over the entire surface
(2) A process in which a multi-molecule adsorption layer is formed and is accompanied by capillary condensation filling of pores
(3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When carbon nanotubes have a t-plot shape such as described above, this indicates that the carbon nanotubes have a large ratio of internal specific surface area relative to total specific surface area and that there is a large number of openings in the carbon nanotubes.

A bending point of the t-plot for the carbon nanotubes is preferably within a range satisfying $0.2 \le t\ (nm) \le 1.5$, more preferably within a range satisfying $0.45 \le t\ (nm) \le 1.5$, and even more preferably within a range satisfying $0.55 \le t\ (nm) \le 1.0$. When the bending point of the t-plot for the carbon nanotubes is within any of the ranges set forth above, dispersibility of the carbon nanotubes can be increased, and characteristics of the cross-linked rubber and the seal material, such as non-adherence to metal surfaces, can be enhanced using a small amount of the carbon nanotubes. More specifically, the carbon nanotubes aggregate more easily and dispersibility thereof decreases when the value of the bending point is less than 0.2, whereas the carbon nanotubes become entangled more easily and dispersibility thereof decreases when the value of the bending point is more than 1.5.

The "position of the bending point" is defined as an intersection point of a linear approximation A for the above-described process (1) and a linear approximation B for the above-described process (3).

A ratio (S2/S1) of internal specific surface area S2 of the carbon nanotubes relative to total specific surface area S1 of the carbon nanotubes obtained from the t-plot is preferably not less than 0.05 and not more than 0.30. When the value of S2/S1 for the carbon nanotubes is within the range set forth above, dispersibility of the carbon nanotubes can be increased, and characteristics of the cross-linked rubber and the seal material, such as non-adherence to metal surfaces, can be enhanced using a small amount of the carbon nanotubes.

The total specific surface area S1 and the internal specific surface area S2 of the carbon nanotubes can be determined from the t-plot for the carbon nanotubes. Specifically, the total specific surface area S1 and the external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Note that measurement of an adsorption isotherm for carbon nanotubes, preparation of a t-plot, and calculation of total specific surface area S1 and internal specific surface area S2 based on analysis of the t-plot can be performed, for example, using a BELSORP®-mini (BELSORP is a registered trademark in Japan, other countries, or both), which is a commercially available measurement apparatus produced by Bel Japan Inc.

Carbon nanotubes that have a radial breathing mode (RBM) peak upon evaluation by Raman spectroscopy are preferable as carbon nanotubes that can suitably be used herein. Note that an RBM is not present in the Raman spectrum of only multi-walled carbon nanotubes having three or more walls.

The CNTs can be produced by any known CNT synthesis method such as arc discharge, laser ablation, or chemical vapor deposition (CVD) without any specific limitations. Specifically, the CNTs can be efficiently produced, for example, by a method in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve catalytic activity of the catalyst layer (super growth method; refer to WO2006/011655A1). Hereinafter, carbon nanotubes that are obtained by the super growth method are also referred to as "SGCNTs".

The content of the CNTs in the cross-linkable rubber composition per 100 parts by mass of the previously described binary fluororubber is preferably 0.1 parts by mass or more, more preferably 0.2 parts by mass or more, even more preferably 0.4 parts by mass or more, and further preferably 0.5 parts by mass or more, and is preferably 4 parts by mass or less, more preferably 3 parts by mass or less, even more preferably 2 parts by mass or less, further preferably 1.5 parts by mass or less, and even further preferably 1 part by mass or less. When the content of the CNTs is not less than any of the lower limits set forth above, characteristics of the cross-linked rubber, such as non-adherence to metal surfaces, can be enhanced. Moreover, when the content of the CNTs is not more than any of the upper limits set forth above, reduction of dispersibility of the CNTs and the occurrence of non-uniformity of characteristics of the cross-linked rubber, such as non-adherence to metal surfaces, can be inhibited. Accordingly, non-adherence to metal surfaces of the seal material can be further increased through the content of the CNTs being within any of the specific ranges set forth above. Furthermore, when the content of the CNTs in the cross-linkable rubber composition is not more than any of the upper limits set forth above, sufficiently high compression set resistance of the obtained cross-linked rubber and seal material can be ensured.

—Other Carbon Materials—

Known carbon materials can be used as other carbon materials besides the carbon nanotubes without any specific limitations. More specifically, particulate carbon materials, fibrous carbon materials, and the like can be used as other carbon materials.

Examples of particulate carbon materials that can be used include, but are not specifically limited to, graphite such as artificial graphite, flake graphite, flaked graphite, natural graphite, acid-treated graphite, expandable graphite, and expanded graphite; and carbon black. Examples of fibrous carbon materials that can be used include, but are not specifically limited to, fibrous carbon nanostructures other than CNTs and fibrous carbon materials other than fibrous carbon nanostructures.

It is preferable that a particulate carbon material is used as another carbon material, and particularly preferable that carbon black is used as another carbon material. This is because by using carbon black as another carbon material, a suitable degree of strength can be imparted to the cross-linked rubber and the seal material, and compression set resistance of the cross-linked rubber and the seal material can be increased.

The content of the carbon black in the cross-linkable rubber composition per 100 parts by mass of the previously described binary fluororubber is preferably 5 parts by mass or more, more preferably 10 parts by mass or more, even more preferably 15 parts by mass or more, and further preferably 20 parts by mass or more, and is preferably 40 parts by mass or less, more preferably 35 parts by mass or less, and even more preferably 30 parts by mass or less. When the content of the carbon black in the cross-linkable rubber composition is not less than any of the lower limits set forth above, compression set resistance of the cross-linked rubber and the seal material can be further increased. Moreover, when the content of the carbon black in the cross-linkable rubber composition is not more than any of the upper limits set forth above, flexibility of the cross-linked rubber and the seal material can be well maintained, and sufficiently high sealing performance of the seal material can be ensured.

The BET specific surface area of the carbon black is preferably not less than 8 $m^2/g$ and not more than 100 $m^2/g$. When the BET specific surface area of the carbon black is not less than the lower limit set forth above, sufficiently high mechanical strength of the obtained cross-linked rubber and seal material can be ensured. On the other hand, when the BET specific surface area of the carbon black is not more than the upper limit set forth above, sufficiently high compression set resistance of the obtained cross-linked rubber and seal material can be ensured.

[Polyol Cross-Linker]

The polyol cross-linker is a component that can impart sufficient elasticity and good compression set resistance to the obtained cross-linked rubber and seal material by cross-linking between molecules of the previously described binary fluororubber.

A polyhydroxy aromatic compound can suitably be used as the polyol cross-linker from a viewpoint of increasing compression set resistance of the cross-linked rubber and the seal material. Examples of polyhydroxy aromatic compounds include, but are not specifically limited to, 2,2-bis (4-hydroxyphenyl)propane (bisphenol A), 2,2-bis(4-hydroxyphenyl)perfluoropropane (bisphenol AF), resorcinol, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl) butane, 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenyl ketone, tri(4-hydroxyphenyl)methane, 3,3',5,5'-tetrachlorobisphenol A, and 3,3',5,5'-tetrabromobisphenol A. Of these polyhydroxy aromatic compounds, the use of bisphenol AF is preferable.

The content of the polyhydroxy aromatic compound in the cross-linkable rubber composition per 100 parts by mass of the previously described binary fluororubber is preferably 0.1 parts by mass or more, more preferably 0.2 parts by mass or more, and even more preferably 0.4 parts by mass or more, and is preferably 10 parts by mass or less, more preferably 6 parts by mass or less, and even more preferably 3 parts by mass or less. When the content of the polyhydroxy aromatic compound in the cross-linkable rubber composition is not less than any of the lower limits set forth above, compression set resistance of the cross-linked rubber and the seal material can be further increased. Moreover, when the content of the polyhydroxy aromatic compound in the cross-linkable rubber composition is not more than any of the upper limits set forth above, it is possible to prevent excessive cross-linking from conversely causing loss of elasticity of the cross-linked rubber and the seal material and to further increase compression set resistance of the seal material.

[Compounding Agents]

Examples of compounding agents that can optionally be used in the cross-linkable rubber composition include known compounding agents such as cross-linking promoters and acid acceptors.

—Cross-Linking Promoter—

It is preferable that least one selected from the group consisting of an ammonium salt, a phosphonium salt, and an amine compound is included as a cross-linking promoter. By using at least one of the specific components set forth above as a cross-linker, a cross-linking reaction of the binary fluororubber by the previously described polyol cross-linker can be promoted, and compression set resistance of the cross-linked rubber and the seal material can be increased.

Examples of ammonium salts that can be used as cross-linking promoters include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methyl sulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride, 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Examples of phosphonium salts that can be used include tetrabutylphosphonium chloride, benzyltrimethylphosphonium chloride, benzyltributylphosphonium chloride, tributylallylphosphonium chloride, tributyl-2-methoxypropylphosphonium chloride, benzylphenyl (dimethylamino)phosphonium chloride, and benzyltriphenylphosphonium chloride. Examples of amine compounds that can be used include cyclic amines and monofunctional amine compounds.

Of these examples, the use of a phosphonium salt is preferable from a viewpoint of further increasing compression set resistance of the cross-linked rubber and the seal material, with the use of benzyltriphenylphosphonium chloride being more preferable.

The content of the cross-linking promoter in the cross-linkable rubber composition per 100 parts by mass of the previously described binary fluororubber is preferably 0.1 parts by mass or more, more preferably 0.2 parts by mass or more, and even more preferably 0.3 parts by mass or more, and is preferably 5 parts by mass or less, more preferably 4 parts by mass or less, and even more preferably 3 parts by mass or less. When the content of the cross-linking promoter in the cross-linkable rubber composition is not less than any of the lower limits set forth above, compression set resistance of the cross-linked rubber and the seal material can be further increased. Moreover, when the content of the cross-linking promoter in the cross-linkable rubber composition is not more than any of the upper limits set forth above, it is possible to prevent excessive cross-linking from conversely causing loss of elasticity of the cross-linked rubber and the seal material and to further increase compression set resistance of the cross-linked rubber and the seal material.

—Acid Acceptor—

An acid acceptor is a component that can absorb hydrogen fluoride produced through a cross-linking reaction of the binary rubber by the polyol cross-linker. Accordingly, the inclusion of an acid acceptor in the cross-linkable rubber composition can inhibit degradation of the cross-linked rubber caused by hydrogen fluoride. As a consequence, loss of elasticity of the cross-linked rubber and the seal material can be well inhibited, and compression set resistance of the cross-linked rubber and the seal material can be increased. Furthermore, non-adherence to metal surfaces of the cross-linked rubber and the seal material can be increased.

Examples of acid acceptors include, but are not specifically limited to, magnesium oxide, calcium oxide, zinc oxide, calcium silicate, calcium hydroxide, zinc hydroxide, aluminum hydroxide, and hydrotalcite. Of these acid acceptors, the use of magnesium oxide or calcium hydroxide is preferable, and the use of magnesium oxide and calcium hydroxide in combination is more preferable. By using magnesium oxide and calcium hydroxide in combination as acid acceptors, non-adherence to metal surfaces and compression set resistance of the cross-linked rubber and the seal material can be further increased.

In a case in which magnesium oxide and calcium hydroxide are used in combination as acid acceptors, the content of magnesium oxide in the cross-linkable rubber composition per 100 parts by mass of the previously described binary fluororubber is preferably 1 part by mass or more, more preferably 1.5 parts by mass or more, and even more preferably 3 parts by mass or more, and is preferably 5 parts by mass or less, and more preferably 4 parts by mass or less. The content of calcium hydroxide in the cross-linkable rubber composition per 100 parts by mass of the previously described binary fluororubber is preferably 4 parts by mass or more, more preferably 5 parts by mass or more, and even more preferably 6 parts by mass or more, and is preferably 10 parts by mass or less, and more preferably 8 parts by mass or less. When the content of magnesium oxide and the content of calcium hydroxide in the cross-linkable rubber composition are not less than any of the lower limits set forth above, non-adherence to metal surfaces and compression set resistance of the cross-linked rubber and the seal material can be even further increased. Moreover, when the content of magnesium oxide and the content of calcium hydroxide in the cross-linkable rubber composition are not more than any of the upper limits set forth above, cross-linking can be performed with an appropriate cross-linking rate, and compression set resistance of the cross-linked rubber and the seal material can be further increased.

[Production Method of Cross-Linkable Rubber Composition]

The cross-linkable rubber composition can be produced by mixing the components set forth above by a known method. For example, the cross-linkable rubber composition can be efficiently produced by performing a mixing step of mixing a binary fluororubber and a carbon material including one or more carbon nanotubes to produce a mixture, and subsequently performing a kneading step of kneading the mixture, a polyol cross-linker, and optional compounding agents and the like.

—Mixing Step—

In the mixing step, the binary fluororubber and the carbon nanotubes serving as a carbon material are mixed to produce a mixture.

Production of the mixture of the binary fluororubber and the carbon nanotubes can be performed by any mixing method that enables dispersion of the carbon nanotubes in the binary fluororubber.

For example, the carbon nanotubes may be added to a rubber dispersion liquid obtained by dissolving or dispersing the binary rubber in a dispersion medium such as an organic solvent and known dispersing treatment may then be performed to obtain a dispersing treatment liquid. Alternatively, the carbon nanotubes may be added to an organic solvent or dispersion medium in which the binary rubber can be dissolved or dispersed, dispersing treatment thereof may be performed, the binary rubber may then be added to the resultant carbon nanotube dispersion liquid, and the binary rubber may be dissolved or dispersed to obtain a dispersing treatment liquid.

The mixture of the binary rubber and the carbon nanotubes can then be produced by removing the organic solvent or dispersion medium from the dispersing treatment liquid obtained in this manner by a known method.

The dispersing treatment can be performed by a known dispersing treatment method. Examples of such dispersing treatment methods include, but are not specifically limited to, dispersing treatment performed by an ultrasonic homogenizer, a wet jet mill, a high-speed rotation shear disperser, or the like.

The dispersion medium is removed from the obtained dispersing treatment liquid to obtain the mixture. The method by which the dispersion medium is removed can be a known method such as coagulation, casting, or drying.

—Kneading Step—

In the kneading step, the mixture, the polyol cross-linker, and optional compounding agents and the like are kneaded to obtain the cross-linkable rubber composition.

More specifically, the cross-linkable rubber composition can be obtained by further adding the polyol cross-linker and optional compounding agents such as a cross-linking promoter and an acid acceptor to the mixture obtained in the mixing step set forth above and performing kneading thereof. Kneading of the mixture, the polyol cross-linker, and optional compounding agents can be performed using a mixer, a single screw kneader, a twin screw kneader, a roll, a pressure kneader, a Brabender® (Brabender is a registered trademark in Japan, other countries, or both), an extruder, or the like.

Note that in addition to the components described above, a carbon material other than the carbon nanotubes (for example, carbon black) and a binary fluororubber may be further added during kneading.

<<Production Method of Cross-Linked Rubber (Seal Material)>>

The cross-linked rubber can be produced through cross-linking of the cross-linkable rubber composition set forth above. Moreover, the cross-linked rubber can be formed with a desired shape during cross-linking so as to produce the seal material. Specifically, the seal material can be produced by heating the cross-linkable rubber composition so as to perform a cross-linking reaction and fix the shape of the obtained cross-linked rubber. For example, by loading the cross-linkable rubber composition into a mold of a desired shape and performing heating thereof when producing the seal material, it is possible to perform press forming and cross-linking simultaneously. It is also possible to perform press forming and primary cross-linking simultaneously by loading the cross-linkable rubber composition into a mold of a desired shape and performing heating thereof, and to subsequently perform secondary-crosslinking by using a heating device such as a Geer oven to reheat the primary cross-linked product that is obtained.

Note that the conditions of the cross-linking reaction such as the temperature and time can be set as appropriate within ranges such that the desired effects are obtained.

<<Physical Properties of Cross-Linked Rubber>>

[Adhesion Strength to Metal Surface]

The adhesion strength to a metal surface of the cross-linked rubber used in the presently disclosed seal material after the cross-linked rubber is heated at 250° C. for 70 hours while in contact with the metal surface is required to be 2 N or less, and is preferably 1.5 N or less, more preferably 1 N or less, and even more preferably 0.4 N or less. When the adhesion strength of the cross-linked rubber to a metal surface is not more than any of the upper limits set forth above, the seal material can display excellent non-adherence to metal surfaces.

[Surface Resistivity]

The surface resistivity of the cross-linked rubber used in the presently disclosed seal material can be in the electrostatic discharge region (ESD) of $1\times10^8$ Ω/sq. to $1\times10^5$ Ω/sq. or can be in the conductive region of $1\times10^5$ Ω/sq. or less.

In a case in which the surface resistivity of the cross-linked rubber is $1\times10^8$ Ω/sq. to $1\times10^5$ Ω/sq., electrostatic charge can be dissipated without a violent electrostatic discharge even when a charged body comes into contact with the cross-linked rubber. Moreover, in a case in which the surface resistivity of the cross-linked rubber is $1\times10^5$ Ω/sq. or less, static electricity charged to the cross-linked rubber or the like can be instantly discharged. Through the surface resistivity of the cross-linked rubber being within any of the ranges set forth above, the seal material formed of the cross-linked rubber can well prevent interference caused by static electricity, such as attachment of contaminants.

[Compression Set]

The compression set of the cross-linked rubber used in the presently disclosed seal material after being heated at 250°

C. for 70 hours is preferably 80% or less, more preferably 70% or less, even more preferably 60% or less, and further preferably 55% or less. When the compression set of the cross-linked rubber after being heated under the specific conditions set forth above is not more than any of the upper limits set forth above, the seal material has excellent compression set resistance, and thus can display good sealing performance over a long period.

<<Surface Area of Carbon Material Contained in Cross-Linked Rubber>>

The surface area S of the carbon material contained in the cross-linked rubber used in the presently disclosed seal material is preferably 5 $m^2/g$ or more, more preferably 5.5 $m^2/g$ or more, and even more preferably 6 $m^2/g$ or more, and is preferably 25 $m^2/g$ or less, and more preferably 15 $m^2/g$ or less. When the surface area S of the carbon material contained in the cross-linked rubber is not less than any of the lower limits set forth above, non-adherence to metal surfaces of the seal material can be further increased. On the other hand, when the surface area S of the carbon material contained in the cross-linked rubber is not more than any of the upper limits set forth above, sufficiently high compression set resistance of the seal material can be ensured.

Note that the value of the surface area S of the carbon material contained in the cross-linked rubber can be adjusted by altering the type and the content of the carbon material in the cross-linkable rubber composition used to produce the cross-linked rubber. For example, the value of S can be efficiently increased by increasing the content of fibrous carbon nanostructures, such as carbon nanotubes, having a large BET specific surface area. On the other hand, it is difficult to efficiently increase the value of S by increasing the content of a carbon material having a small BET specific surface area, such as a carbon material (carbon black, etc.) other than fibrous carbon nanostructures.

<<Ratio Cs/Ca of Concentration Cs of Carbon Material at Surface of Cross-Linked Rubber and Average Concentration Ca of Carbon Material in Cross-Linked Rubber>>

A ratio Cs/Ca of the concentration Cs of the carbon material at the surface of the cross-linked rubber and the average concentration Ca of the carbon material in the cross-linked rubber is preferably 0.5 or more, more preferably more than 1, even more preferably 1.5 or more, and further preferably 2 or more, and is preferably 8 or less, and more preferably 6 or less. When the ratio of Cs/Ca is 0.5 or more, the obtained cross-linked rubber and seal material can display even better non-adherence to metal surfaces. On the other hand, when the ratio of Cs/Ca is 8 or less, the carbon material is not excessively concentrated at the surface of the cross-linked rubber and a sufficient amount of the carbon material is present in an inner part of the cross-linked rubber, which makes it possible for the obtained cross-linked rubber and seal material to display sufficient strength.

The value of the ratio Cs/Ca of the concentration Cs of the carbon material at the surface of the cross-linked rubber and the average concentration Ca of the carbon material in the cross-linked rubber can be adjusted by altering the type and content of components in the cross-linkable rubber composition used to produce the cross-linked rubber, and particularly the type and content of the carbon material.

Note that the average concentration Ca (mass %) of the carbon material in the cross-linked rubber is normally the same as the proportional content (mass %) of the carbon material in the previously described cross-linkable rubber composition. However, in a situation in which the proportional content (mass %) of the carbon material in the cross-linkable rubber composition is unknown, for example, the average concentration Ca of the carbon material in the cross-linked rubber can be measured through analysis of the cross-linked rubber in accordance with a method described in JIS K-6226-2:2003.

Although it is not clear why the cross-linked rubber and the seal material can display even better non-adherence to metal surfaces when the ratio Cs/Ca of the concentration Cs of the carbon material at the surface of the cross-linked rubber and the average concentration Ca of the carbon material in the cross-linked rubber is not less than any of the specific values set forth above, the reason for this is presumed to be as follows. Specifically, it is presumed that increasing the concentration of the carbon material at the surface of the cross-linked rubber can reduce the concentration of the binary rubber at the surface of the cross-linked rubber and can reduce physical interactions between a metal surface and the cross-linked rubber, which can thereby reduce adhesion strength of the cross-linked rubber to the metal surface.

EXAMPLES

The following provides a more specific description of the present disclosure based on examples. However, the present disclosure is not limited to these examples. In the following description, "%" and "parts" used in expressing quantities are by mass, unless otherwise specified.

In the examples and comparative examples, the following methods were used to measure or calculate the adhesion strength to a metal surface, compression set, and surface resistivity of a cross-linked rubber, the surface area S of a carbon material contained in the cross-linked rubber, and the ratio Cs/Ca of the concentration Cs of the carbon material at the surface of the cross-linked rubber and the average concentration Ca of the carbon material in the cross-linked rubber.

<Adhesion Strength of Cross-Linked Rubber to Metal Surface>

A mold was used to press form a cross-linkable rubber composition at 160° C. for 20 minutes under pressing at 10 MPa to obtain a primary cross-linked product that had been press formed as a P-28 O-ring (cross-sectional diameter: 3.5 mm; inside diameter: 27.7 mm; outside diameter: 34.7 mm) defined by JIS B2401. Next, the obtained primary cross-linked product was heated under conditions of 2 hours at 232° C. in a Geer oven to perform secondary cross-linking. An obtained seal material formed of an O-ring shaped cross-linked rubber was cut (thickness direction cut) into a semicircular shape to obtain a test specimen. Aluminum foil was wrapped around a 1 cm section from one end A of the test specimen, silicone oil was applied onto an upper surface of the semicircular shape, and then the test specimen was sandwiched between stainless steel (SUS304) metal plates of 1 mm in thickness and was compressed by 25% in the thickness direction to obtain a test body. This test body was placed inside a 250° C. Geer oven and was left for 70 hours. After being left, the test body was removed from the Geer oven and was cooled to room temperature. The compression was subsequently released, and the upper surface metal plate (metal plate at the side at which silicone oil was present) was removed. The metal plate with the semicircular O-ring affixed thereto was secured in place and then a clip was attached to the section at the end A of the test specimen where the aluminum foil was wrapped. A mechanical force gauge (FB-20N produced by Imada Co., Ltd.) was pulled in a perpendicular direction in a state with the clip suspended therefrom, and the maximum load (N) measured during this pulling was taken to be the adhesion strength of the cross-linked rubber to the metal surface. A smaller value for the adhesion strength of the cross-linked rubber to the metal surface as measured by the method described above indicates that a seal material formed of the cross-linked rubber can display better non-adherence to metal surfaces.

<Compression Set>

A mold was used to press form a cross-linkable rubber composition at 160° C. for 25 minutes under pressing at 10 MPa to obtain a primary cross-linked product having a cylindrical shape of 29 mm in diameter and 12.7 mm in height. Next, the obtained primary cross-linked product was heated under conditions of 2 hours at 232° C. in a Geer oven to perform secondary cross-linking and thereby obtain a seal material formed of a cylindrical cross-linked rubber. The cross-linked rubber forming the obtained seal material was used to measure the compression set after the cross-linked rubber had been left in a 250° C. environment for 70 hours in a state of 25% compression in accordance with JIS K6262. A smaller value for the compression set of the cross-linked rubber indicates that a seal material formed of the cross-linked rubber has better compression set resistance.

<Surface Resistivity>

A cross-linkable rubber composition was loaded into a mold having a length of 15 cm, a width of 15 cm, and a depth of 0.2 cm and was press formed at 160° C. for 20 minutes while being pressed at 10 MPa to obtain a sheet-shaped primary cross-linked product. Next, the sheet-shaped primary cross-linked product that had been obtained was heated under conditions of 2 hours at 232° C. in a Geer oven to perform secondary cross-linking and thereby obtain a seal material formed of a sheet-shaped cross-linked rubber. The obtained seal material was used as a test specimen in order to measure the surface resistivity in a central part of a face of the test specimen using a low resistivity meter (produced by Mitsubishi Chemical Analytech Co., Ltd.; product name: Loresta-GP MCP-T600; applied voltage: 90 V; LSP probe) under conditions of a temperature of 23° C. and a humidity of 50% RH to determine the surface resistivity of the cross-linked rubber. A smaller value for the surface resistivity of the cross-linked rubber indicates that a seal material formed of the cross-linked rubber has better electrical conductivity and can better prevent interference caused by static electricity, such as attachment of contaminants.

<Surface Area S of Carbon Material Contained in Cross-Linked Rubber>

The surface area S of a carbon material contained in a cross-linked rubber obtained in each example or comparative example was calculated by the previously described formula (1).

Note that the mass of the cross-linked rubber and the mass of a cross-linkable rubber composition used to produce the cross-linked rubber were taken to be the same, and the contents $R_1$ to $R_n$ (g) of carbon materials $C_1$ to $C_n$ in the total amount A (g) of the cross-linked rubber were respectively taken to be the same as the contents $R_1'$ to $R_n'$ of the carbon materials $C_1$ to $C_n$ in the total amount A (g) of the cross-linkable rubber composition used to produce the cross-linked rubber.

<Ratio Cs/Ca of Concentration Cs of Carbon Material at Surface of Cross-Linked Rubber and Average Concentration Ca of Carbon Material in Cross-Linked Rubber>

The concentration Cs of a carbon material at the surface of a cross-linked rubber and the average concentration Ca of the carbon material in the cross-linked rubber were determined by the following methods, and then the ratio Cs/Ca thereof was calculated.

<<Concentration Cs of Carbon Material at Surface of Cross-Linked Rubber>>

A seal material formed of a sheet-shaped cross-linked rubber was obtained using a cross-linkable rubber composition in the same way as in measurement of surface resistivity of a shaped product described above. A 3 mm square was cut from the seal material and was secured to carbon double-sided tape such that the surface of the cross-linked rubber was at an upper surface to obtain a test specimen. The obtained test specimen was analyzed by an X-ray photoelectron spectrometer (XPS; AXIS ULTRA DLD produced by Kratos Analytical Ltd.) to calculate the concentration Cs (mass %) of a carbon material at the surface of the cross-linked rubber. The analysis method and measurement conditions in XPS and the calculation method of Cs were as follows.

[Analysis Method]

Wide scan analysis and narrow scan analysis

[Measurement Conditions]

X-ray source: Al K-α monochromator

X-ray conditions: 150 W (accelerating voltage: 15 kV; current value: 10 mA)

Photoelectron take-off angle: Angle θ of sample surface and detector direction=90°

[Measurement Conditions]

Under the measurement conditions listed above, wide scan analysis was first performed to confirm elements present in the cross-linked rubber, and then narrow scan analysis was performed for all of the detected elements. Next, an analysis application (Vision Processing produced by Kratos Analytical Ltd.) was used to calibrate a peak attributed to the carbon material for the 1s orbital of carbon to 284.5 eV, to then integrate the measured peak area for each element, and to calculate an element ratio (carbon concentration dC (mass %)) at the surface of the cross-linked rubber after calibration using sensitivity factors for the various elements. Next, curve fitting was performed for a spectrum obtained for the 1s orbital of carbon detected at from 282 eV to 298 eV, and the carbon concentration dCs (mass %) attributed to the carbon material among all carbon was calculated. Next, the product of the carbon concentration dC calculated from the ratio of the various elements and the carbon concentration dCs attributed to the carbon material among all carbon was used in the following formula to calculate the concentration Cs (mass %) of carbon filler present at the surface of cross-linked rubber.

$$Cs=(dC \times dCs)/100$$

<<Average Concentration Ca of Carbon Material in Cross-Linked Rubber>>

The average concentration Ca of the carbon material in the cross-linked rubber was taken to be the same as the proportional content (mass %) of the carbon material in the cross-linkable rubber composition. Accordingly, Ca (mass %) was calculated by the following formula.

$$Ca=(\text{Content of carbon material in cross-linkable rubber composition/Amount of all components in cross-linkable rubber composition}) \times 100$$

Example 1-1

<Carbon Nanotubes Including Single-Walled Carbon Nanotubes>

Carbon nanotubes produced by the super growth method (ZEONANO SG101 produced by Zeon Nanotechnology Co., Ltd.) were used as a carbon material $C_1$. The carbon nanotubes (also referred to as "SGCNTs" as appropriate) were mainly single-walled CNTs, and in measurement thereof using a Raman spectrophotometer, a radial breathing mode (RBM) spectrum that is characteristic of single-walled CNTs was observed in a low wavenumber region of 100 $cm^{-1}$ to 300 $cm^{-1}$. The BET specific surface area of the SGCNTs measured by a BET specific surface area meter (BELSORP®-max produced by Bel Japan Inc.) was 1,347 $m^2/g$ (unopened). In addition, the average diameter (Av), the diameter standard deviation (σ), and the average length of the SGCNTs were determined by measuring the diameters and lengths of 100 randomly selected SGCNTs using a transmission electron microscope. The average diameter (Av) was 3.3 nm, a value (3σ) obtained by multiplying the standard deviation (σ) by 3 was 1.9 nm, the ratio thereof (3σ/Av) was 0.58, and the average length was 500 μm. In a t-plot for the SGCNTs measured using a BELSORP®-mini produced by Bel Japan Inc., the t-plot was bent in a convex upward shape. Moreover, S2/S1 was 0.09, and the bending point position t was 0.6 nm.

<Production of Cross-Linkable Rubber Composition>
<<Production of Mixture>>

After adding 100 g of a binary fluororubber (Viton A500 produced by the Chemours Company; vinylidene fluoride-hexafluoropropylene copolymer; fluorine content: 66 mass %) to 900 g of methyl ethyl ketone as an organic solvent, the binary fluororubber was stirred therewith for 24 hours to dissolve the binary fluororubber.

Next, 4 g of the SGCNTs serving as the carbon material $C_1$ were added to the resultant binary fluororubber solution and were stirred therewith for 15 minutes using a stirrer (LABOLUTION® (LABOLUTION is a registered trademark in Japan, other countries, or both) produced by PRIMIX Corporation). In addition, a wet jet mill (L-ES007 produced by Yoshida Kikai Co., Ltd.) was used to perform dispersing treatment of the solution to which the SGCNTs had been added at 90 MPa. Thereafter, the resultant dispersing treatment liquid was added dropwise to 4,000 g of isopropyl alcohol to cause coagulation and obtain a black solid. The obtained black solid was dried under reduced pressure at 60° C. for 12 hours to obtain a mixture (masterbatch) of binary fluororubber and SGCNTs.

<<Kneading>>

A 50° C. open roll mill was subsequently used to knead 52 g of the mixture (masterbatch) of 100 g of binary fluororubber and 4 g of SGCNTs described above, 50 g of a binary fluororubber (Viton A500 produced by the Chemours Company), 3 g of magnesium oxide (produced by Kyowa Chemical Industry Co., Ltd.; product name: KYOWAMAG 150) and 6 g of calcium hydroxide (produced by Ohmi Chemical Industry Co., Ltd.; product name: CALDIC 2000) as acid acceptors, and 2.5 g of a mixed formulation of a polyol cross-linker and a cross-linking promoter (produced by the Chemours Company; product name: VC-50; mixture of bisphenol AF and benzyltriphenylphosphonium chloride in mass ratio of approximately 4/1). The roll nip was adjusted to 2 mm, the rubber kneaded product was subsequently wrapped against a roll, three repetitions of each of left and right cutting back were performed, and sheet discharging was performed to obtain a cross-linkable rubber composition.

A seal material formed of a cross-linked rubber obtained through cross-linking of the obtained cross-linkable rubber composition was used to measure or calculate the adhesion strength of the cross-linked rubber to a metal surface, the surface resistivity of the cross-linked rubber, the compression set of the cross-linked rubber, and the surface area of the carbon material contained in the cross-linked rubber. The results are shown in Table 1.

Example 1-2

A cross-linkable rubber composition was produced in the same way as in Example 1-1 with the exception that, during kneading, the additive amount of the previously described mixture (masterbatch) was changed from 52 g to 26 g and the additive amount of the binary fluororubber (Viton A500 produced by the Chemours Company) was changed from 50 g to 75 g. Moreover, evaluations were performed in the same way as in Example 1-1. The results are shown in Table 1.

Example 1-3

A cross-linkable rubber composition was produced in the same way as in Example 1-2 with the exception that, during kneading, 20 g of carbon black (Thermax MT produced by Cancarb Limited; BET specific surface area: 9.1 $m^2/g$) was further added as a carbon material $C_2$. Moreover, evaluations were performed in the same way as in Example 1-1. The results are shown in Table 1.

Example 1-4

A cross-linkable rubber composition was produced in the same way as in Example 1-1 with the exception that, during kneading, the additive amount of the previously described mixture (masterbatch) was changed from 52 g to 13 g, the additive amount of the binary fluororubber (Viton A500 produced by the Chemours Company) was changed from 50 g to 87.5 g, and 20 g of carbon black (Thermax MT produced by Cancarb Limited; BET specific surface area: 9.1 $m^2/g$) was further added as a carbon material $C_2$. Moreover, evaluations were performed in the same way as in Example 1-1. The results are shown in Table 1.

Comparative Example 1-1

<Production of Cross-Linkable Rubber Composition>
<<Kneading>>

A 50° C. open roll mill was used to knead 100 g of a binary fluororubber (Viton A500 produced by the Chemours Company), 20 g of carbon black (Thermax MT produced by Cancarb Limited; BET specific surface area: 9.1 $m^2/g$) as a carbon material $C_1$, 3 g of magnesium oxide (produced by Kyowa Chemical Industry Co., Ltd.; product name: KYOWAMAG 150) and 6 g of calcium hydroxide (produced by Ohmi Chemical Industry Co., Ltd.; product name: CALDIC 2000) as acid acceptors, and 2.5 g of a mixed formulation of a polyol cross-linker and a cross-linking promoter (produced by the Chemours Company; product name: VC-50; mixture of bisphenol AF and benzyltriphenylphosphonium chloride in mass ratio of approximately 4/1). The roll nip was adjusted to 2 mm, the rubber kneaded product was subsequently wrapped against a roll, three repetitions of each of left and right cutting back were performed, and then sheet discharging was performed to obtain a cross-linkable rubber composition. Moreover, evaluations were performed in the same way as in Example 1-1. The results are shown in Table 1.

Example 2-1

A cross-linkable rubber composition was produced in the same way as in Example 1-1. A seal material formed of a cross-linked rubber obtained through cross-linking of the obtained cross-linkable rubber composition was used to measure or calculate the adhesion strength of the cross-linked rubber to a metal surface, the surface resistivity of the cross-linked rubber, and the ratio Cs/Ca of the concentration Cs of the carbon material at the surface of the cross-linked rubber and the average concentration Ca of the carbon material in the cross-linked rubber. The results are shown in Table 2.

Example 2-2

A cross-linkable rubber composition was produced in the same way as in Example 1-2. Moreover, evaluations were performed in the same way as in Example 2-1. The results are shown in Table 2.

Comparative Example 2-1

A cross-linkable rubber composition was produced in the same way as in Comparative Example 1-1 with the exception that, during kneading, the additive amount of carbon black (Thermax MT produced by Cancarb Limited) was changed from 20 g to 15 g. Moreover, evaluations were performed in the same way as in Example 2-1. The results are shown in Table 2.

Comparative Example 2-2

A cross-linkable rubber composition was produced in the same way as in Comparative Example 1-1 with the exception that, during kneading, the additive amount of carbon black (Thermax MT produced by Cancarb Limited) was changed from 20 g to 30 g. Moreover, evaluations were performed in the same way as in Example 2-1. The results are shown in Table 2.

TABLE 1

|  |  | Example 1-1 | Example 1-2 | Example 1-3 | Example 1-4 | Comparative Example 1-1 |
| --- | --- | --- | --- | --- | --- | --- |
| Binary fluororubber | Viton A500 [parts by mass] | 100 | 100 | 100 | 100 | 100 |
| Carbon material | SGCNTs [parts by mass] (BET specific surface area: 1,347 m$^2$/g) | 2 | 1 | 1 | 0.5 | — |
|  | Carbon black [parts by mass] (BET specific surface area: 9.1 m$^2$/g) | — | — | 20 | 20 | 20 |
| Acid acceptor | Magnesium oxide [parts by mass] | 3 | 3 | 3 | 3 | 3 |
|  | Calcium hydroxide [parts by mass] | 6 | 6 | 6 | 6 | 6 |
| Polyol cross-linker and cross-linking promoter | VC-50 [parts by mass] | 2.5 | 2.5 | 2.5 | 2.5 | 2.5 |
| Surface area S of carbon material contained in cross-linked rubber [m$^2$/g] |  | 23.7 | 12.0 | 11.5 | 6.5 | 1.4 |
| Adhesion strength to metal surface [N] |  | 0.3 | 0.4 | 0.36 | 0.2 | 2.6 |
| Compression set [%] |  | 76 | 60 | 53 | 52 | 52 |
| Surface resistivity [Ω/sq.] |  | $6.6 \times 10^0$ | $2.5 \times 10^1$ | $2.3 \times 10^1$ | $8.0 \times 10^5$ | $9.0 \times 10^{14}$ |

TABLE 2

|  |  | Example 2-1 | Example 2-2 | Comparative Example 2-1 | Comparative Example 2-2 |
| --- | --- | --- | --- | --- | --- |
| Binary fluororubber | Viton A500 [parts by mass] | 100 | 100 | 100 | 100 |
| Carbon material | SGCNTs [parts by mass] | 2 | 1 | — | — |
|  | Carbon black [parts by mass] | — | — | 15 | 30 |
| Acid acceptor | Magnesium oxide [parts by mass] | 3 | 3 | 3 | 3 |
|  | Calcium hydroxide [parts by mass] | 6 | 6 | 6 | 6 |

TABLE 2-continued

|  |  | Example 2-1 | Example 2-2 | Comparative Example 2-1 | Comparative Example 2-2 |
|---|---|---|---|---|---|
| Polyol cross-linker and cross-linking promoter | VC-50 [parts by mass] | 2.5 | 2.5 | 2.5 | 2.5 |
| Cs/Ca |  | 2.3 | 5.9 | 0.3 | 0.2 |
| Adhesion strength to metal surface [N] |  | 0.3 | 0.4 | 2.6 | 2.3 |
| Surface resistivity [Ω/sq.] |  | $6.6 \times 10^0$ | $2.5 \times 10^1$ | $2.7 \times 10^{14}$ | $1.3 \times 10^{15}$ |

It can be seen from Tables 1 and 2 that it is possible to provide a seal material that can display excellent non-adherence to metal surfaces in Examples 1-1 to 1-4, 2-1, and 2-2 in which the obtained cross-linked rubber is obtained through cross-linking of a cross-linkable rubber composition containing a binary fluororubber, a carbon material including carbon nanotubes, and a polyol cross-linker and has an adhesion strength to a metal surface of not more than a specific value after being heated under specific conditions while in contact with the metal surface.

On the other hand, it can be seen that in Comparative Examples 1-1, 2-1, and 2-2 in which a carbon material that does not include carbon nanotubes is used, the obtained cross-linked rubber has an adhesion strength to a metal surface that exceeds a specific value after being heated under specific conditions while in contact with the metal surface, and thus a seal material formed of the cross-linked rubber has poor non-adherence to metal surfaces.

INDUSTRIAL APPLICABILITY

According to the present disclosure, it is possible to provide a seal material having excellent non-adherence to metal surfaces.

The invention claimed is:

1. A seal material comprising a cross-linked rubber, wherein
the cross-linked rubber is obtained through cross-linking of a cross-linkable rubber composition containing a binary fluororubber, a carbon material, and a polyol cross-linker,
the carbon material includes one or more carbon nanotubes, and
the cross-linked rubber has an adhesion strength of 2 N or less to a metal surface after being heated at 250° C. for 70 hours while in contact with the metal surface, wherein
content of the one or more carbon nanotubes in the cross-linkable rubber composition is not less than 0.1 parts by mass and not more than 4 parts by mass per 100 parts by mass of the binary fluororubber,
the polyol cross-linker is a polyhydroxy aromatic compound, and
content of the polyhydroxy aromatic compound in the cross-linkable rubber composition is 0.1 parts by mass or more and 10 parts by mass or less per 100 parts by mass of the binary fluororubber.

2. The seal material according to claim 1, wherein a ratio Cs/Ca of concentration Cs of the carbon material at a surface of the cross-linked rubber and average concentration Ca of the carbon material in the cross-linked rubber is 0.5 or more.

3. The seal material according to claim 2, wherein the ratio Cs/Ca of the concentration Cs of the carbon material at the surface of the cross-linked rubber and the average concentration Ca of the carbon material in the cross-linked rubber is more than 1 and not more than 8.

4. The seal material according to claim 1, used in an environment in which the seal material is in tight contact with a metal surface.

5. The seal material according to claim 1, wherein
the binary fluororubber is a vinylidene fluoride-hexafluoropropylene copolymer, and
the vinylidene fluoride-hexafluoropropylene copolymer has a fluorine content of not less than 65 mass % and not more than 70 mass %.

6. The seal material according to claim 1, wherein
the carbon material includes carbon black, and
content of the carbon black in the cross-linkable rubber composition is not less than 5 parts by mass and not more than 40 parts by mass per 100 parts by mass of the binary fluororubber.

7. The seal material according to claim 1, wherein the carbon material contained in the cross-linked rubber has a surface area S of 5 m²/g or more.

8. The seal material according to claim 1, wherein the one or more carbon nanotubes include one or more single-walled carbon nanotubes.

9. The seal material according to claim 1, wherein the cross-linkable rubber composition further contains a cross-linking promoter.

10. The seal material according to claim 9, wherein
the cross-linking promoter includes at least one selected from the group consisting of an ammonium salt, a phosphonium salt, and an amine compound, and
content of the cross-linking promoter in the cross-linkable rubber composition is not less than 0.1 parts by mass and not more than 5 parts by mass per 100 parts by mass of the binary fluororubber.

11. The seal material according to claim 1, wherein the cross-linkable rubber composition further contains an acid acceptor.

12. The seal material according to claim 11, wherein the acid acceptor includes magnesium oxide and calcium hydroxide.

13. The seal material according to claim 1, wherein the cross-linked rubber has a surface resistivity of $1 \times 10^8$ Ω/sq. or less.

14. The seal material according to claim 1, wherein the cross-linked rubber has a compression set of 80% or less after being heated at 250° C. for 70 hours.

* * * * *